Figure 1:
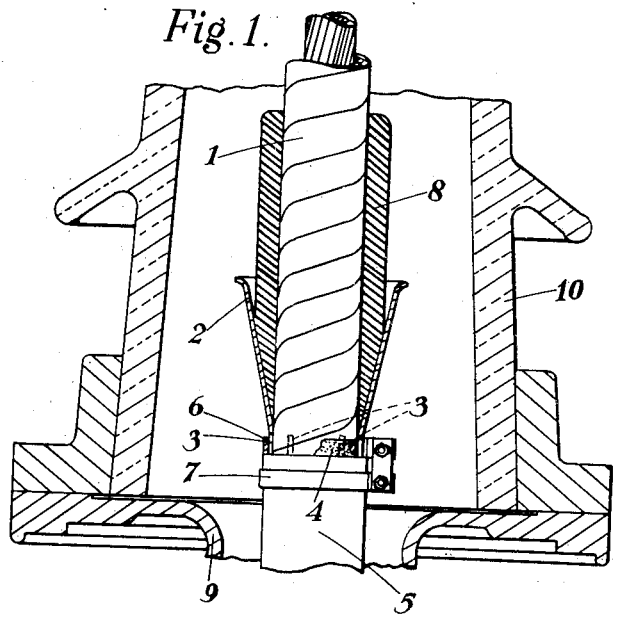

Sept. 26, 1939.　　　　E. BOWDEN ET AL　　　　2,174,377
TERMINATION AND JOINT FOR ELECTRIC CABLES
Filed Sept. 7, 1935　　　　4 Sheets-Sheet 1

INVENTORS
STEPHEN CHAPLIN
AND EDWARD BOWDEN DECEASED
BY ADA BOWDEN AND EDWARD BOWDEN
EXECUTORS
BY
Byrney, Stebbins & Blenko
ATTORNEYS

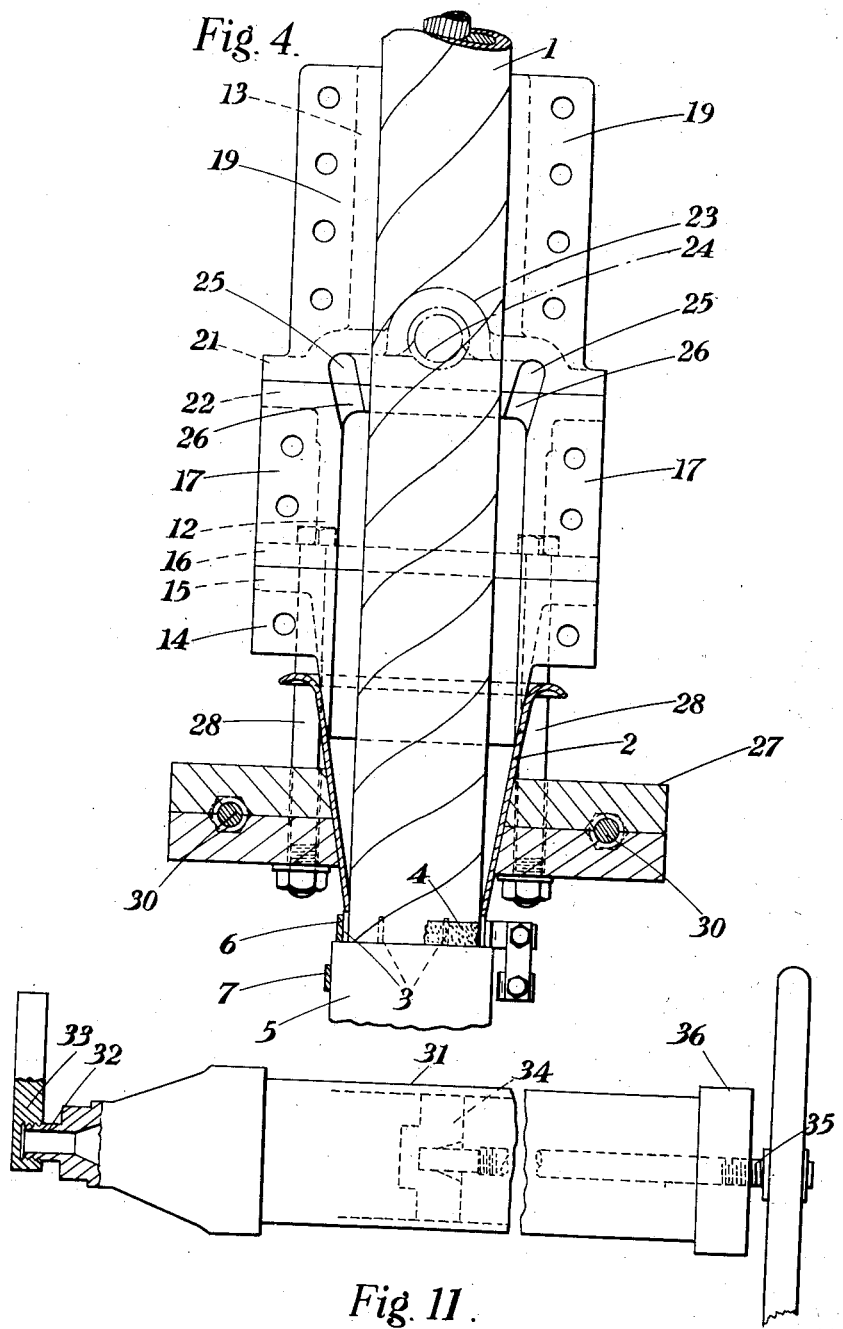

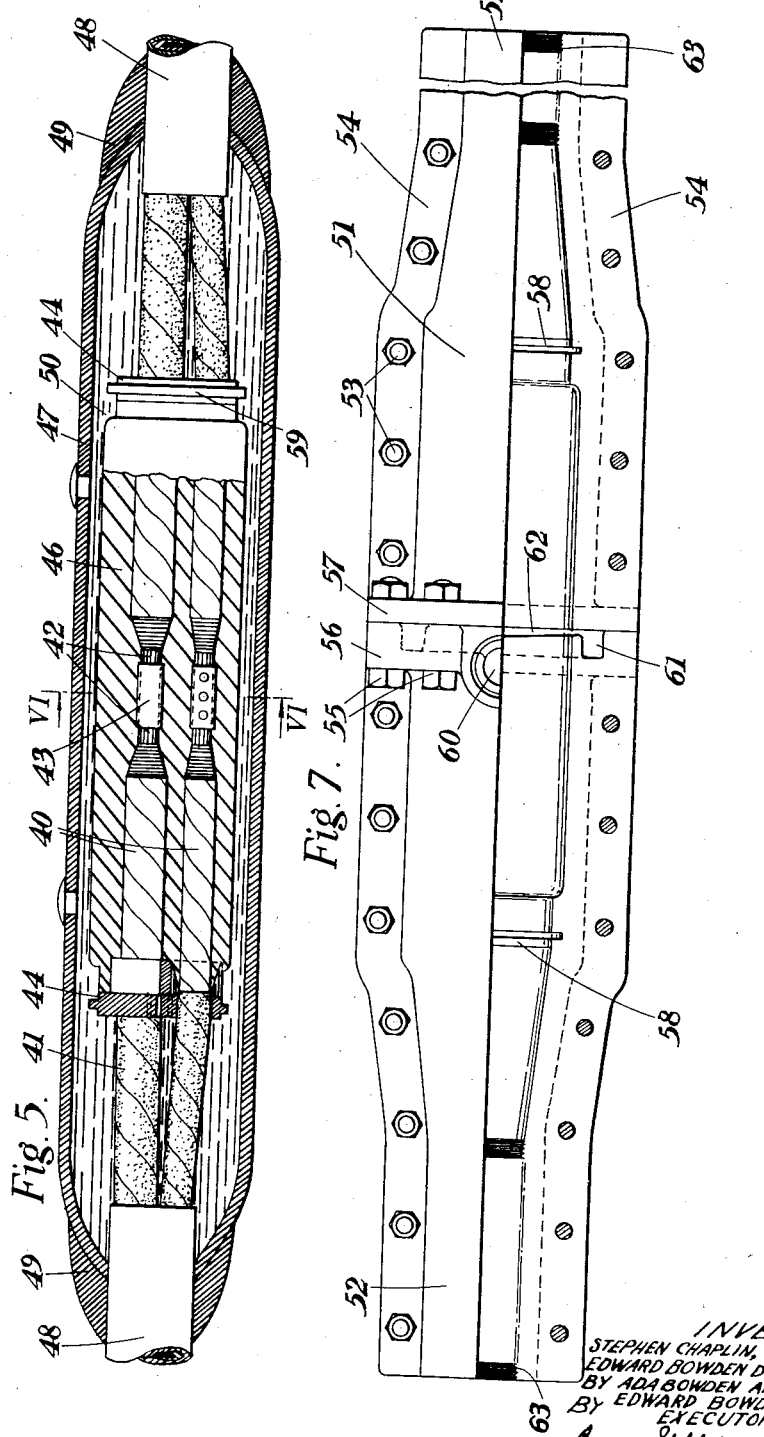

Sept. 26, 1939.  E. BOWDEN ET AL  2,174,377
TERMINATION AND JOINT FOR ELECTRIC CABLES
Filed Sept. 7, 1935  4 Sheets-Sheet 4
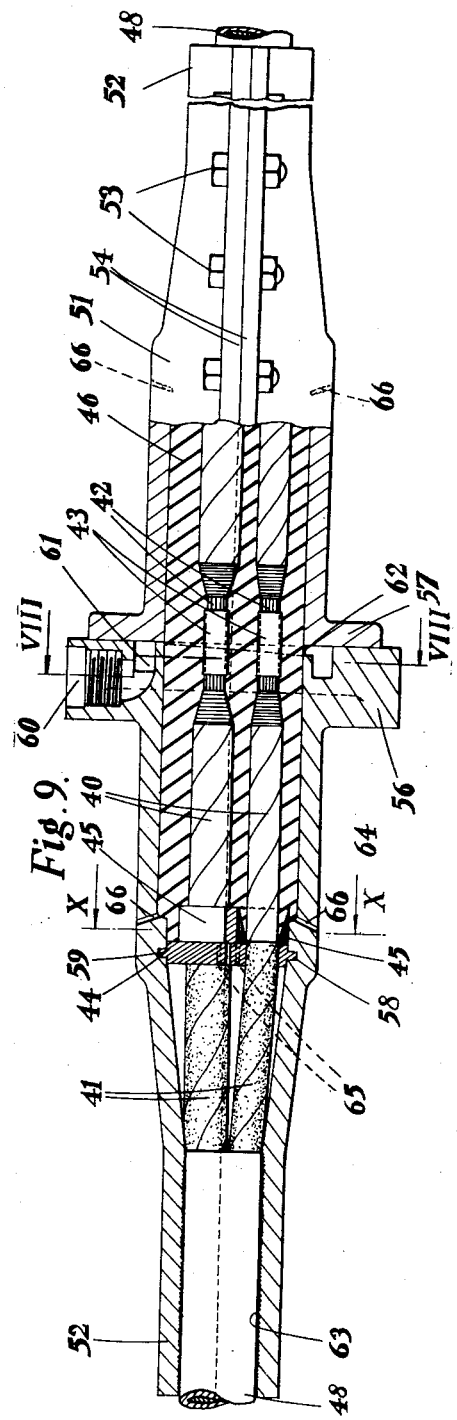
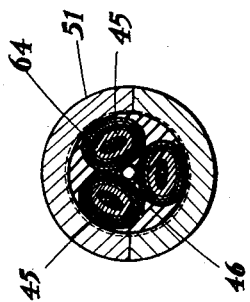
Fig. 10.
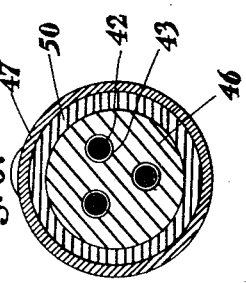
Fig. 6.
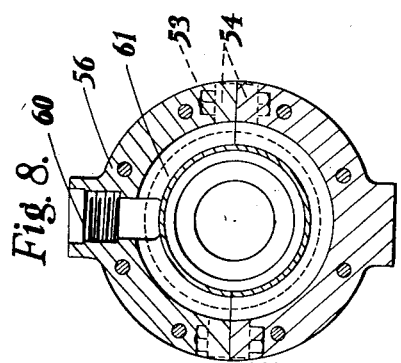
Fig. 8.
INVENTORS
STEPHEN CHAPLIN
AND EDWARD BOWDEN DECEASED
BY ADA BOWDEN AND EDWARD BOWDEN
BY EXECUTORS
Byrnes, Stebbins & Blenko
ATTORNEYS Patented Sept. 26, 1939

2,174,377

UNITED STATES PATENT OFFICE 2,174,377

TERMINATION AND JOINT FOR ELECTRIC CABLES

Edward Bowden, deceased, late of London, England, by Ada Bowden and Edward Bowden, executors, and Stephen Chaplin, London, England, assignors to The Enfield Cable Works Limited, London, England, a company of Great Britain Application September 7, 1935, Serial No. 39,614
In Great Britain September 22, 1934

4 Claims. (Cl. 174—19)

This invention is concerned with impregnated paper insulated electric cable structures, such as joints and terminations. At these places it is usual to apply additional dielectric to the cable in order locally to reinforce the normal cable dielectric where necessary and/or to replace normal cable dielectric that has been removed.

When constructing a termination, the normal cable dielectric is reinforced in the neighborhood of the end of the sheath by additional dielectric material and in high tension cable terminations, it is usual to apply a stress distributing cone to that end of the supplementary dielectric which adjoins the sheath, this cone being made of conductive material and being connected to the sheath. In the case of a joint, a portion of the normal cable dielectric is removed from the end of each conductor to allow the conductor joint to be made and additional dielectric material, usually of fibrous material in tape form, is afterwards applied to replace the cut away insulation and, in the case of high tension cables, to reinforce the normal cable insulation in the region of the joint. In both cases the uncovered length of cable dielectric and the additional dielectric are enclosed in an impervious enclosure, which in the case of a termination usually comprises a cable gland and a tubular insulator mounted thereon and in the case of a joint a metal sleeve generally of lead, and are surrounded by insulating fluid contained in the said enclosure.

After considerable experiment we have found that, by using a suitable homogeneous thermoplastic material and an appropriate method, it is possible to form the additional dielectric required at impregnated paper insulated cable terminations and joints by moulding it on the cable with the aid of a temporary mould which is afterwards removed. For this purpose, we have found that it is essential that the material should be insoluble in oils and compounds of the kind usually employed for impregnating paper insulated cables and for filling the interior of joints and of terminations for such cables. It must also, when moulded, be capable of retaining its shape indefinitely at the maximum temperature likely to be reached by the cable during its working life, that is to say, it must form a self-supporting body, but it must be capable of being made plastic at a temperature which does not adversely affect the cable dielectric. The material should also be capable of adhering to the adjacent surface of the normal cable dielectric. Materials that are suitable are synthetic resins or waxes or suitable cellulose acetate moulding powders, that comply with the above requirements and, preferably, also have a high dielectric strength and a specific inductive capacity equal to or greater than that of the normal cable dielectric. It will also be advantageous to employ a material which, in addition to possessing the above properties, is capable of yielding a translucent, or preferably a transparent, moulding so that any flaw in the moulding may be readily detected when the mould casing is removed.

Accordingly our invention may be said to comprise a structure comprising an impregnated paper-insulated electric cable including an insulated conductor and a conductive covering closely surrounding said insulated conductor and terminated at a distance from one end thereof, a stress-distributing cone fitted to the insulated conductor at the termination of the conductive covering, additional dielectric serving locally to reinforce the normal dielectric of the insulated conductor in the vicinity of the said cone, said additional dielectric comprising a self-supporting moulded body of homogeneous, oil-insoluble, thermo-plastic, insulating material moulded in situ on the insulated conductor and in the said cone, and extending between, and adhering to, the adjacent surface of the normal conductor dielectric and the internal surface of the said cone, an impervious enclosure for the projecting end of the insulated conductor, for the said cone and for the said additional dielectric, and a body of insulating fluid contained in the said enclosure and surrounding the projecting end of the insulated conductor and said additional dielectric and in contact with said additional dielectric. The invention also comprises methods of applying such additional dielectric.

The adhesion of the moulded body to the interior of the stress distributing cone (or cones) insures that there are no layers of air in the electric field within the solid dielectric between the conductor and the stress cone. In the case of a joint, the moulded dielectric material may replace the parts of the cable insulation that are removed from the conductors in the vicinity of the joint (or joints) or it may constitute the reinforcing dielectric. Generally, however, the moulded body will be so shaped that it performs both these functions.

For the application to the cable of the moulded dielectric body, a mould is used which can be applied to and clamped firmly on the outside of the uncovered cable end and can be removed there-from without disturbing the moulded material. For this purpose, the mould will usually be formed of two or more parts. After the mould has been placed in position, the material to be inserted, which has been rendered plastic by appropriate treatment, is forced into the mould until the latter is completely filled. Then the material is allowed or caused to set and finally the mould is removed. The stress distributing cone (or cones) may form part of the mould, being clamped together with the other part or parts and being, of course, left in position when the other parts are removed.

Figure 2:
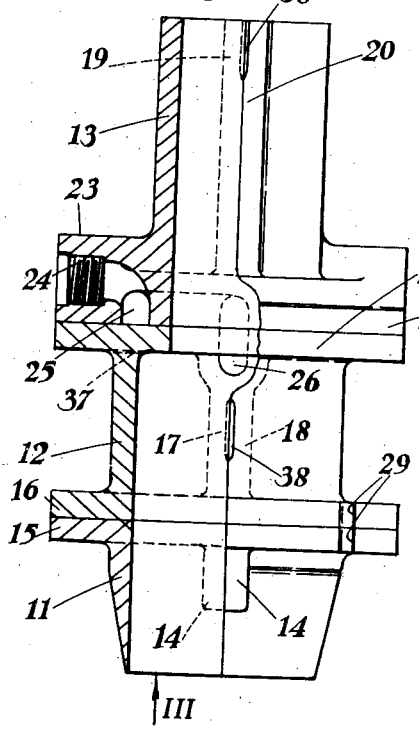
Figure 3:
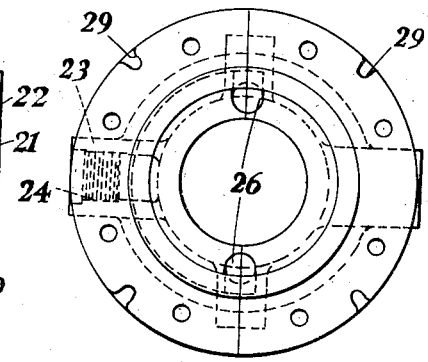

The invention will be further described with reference to the accompanying drawings which show examples of a cable termination and joint constructed in accordance with the invention and examples of apparatus used in the construction thereof and which illustrate the way in which such apparatus is used. In the drawings Figure 1 is a fragmental cross-section of a super-tension single core paper insulated and lead covered cable termination, Figure 2 is a view partly in section and partly in elevation of a mould employed in the construction of the termination shown in Figure 1, Figure 3 is an inverted plan of the mould shown in Figure 2, Figure 4 is a view, partly in section and on an enlarged scale, of a stress cone and one half of the mould shown in Figures 2 and 3, positioned on the prepared end of a super-tension single core paper insulated and lead covered cable, Figure 5 is a cross-sectional elevation of a completed joint in an extra high tension three core paper insulated and lead covered cable, Figure 6 is a cross-section taken on the line VI—VI in Figure 5 of the joint shown therein, Figure 7 is a plan view of a mould employed in the construction of the joint shown in Figure 5, a portion of the upper half of the mould having been removed to expose the interior.

Figure 8 is a cross-sectional view of the mould shown in Figure 7, the cross-section being taken on the line VIII—VIII in Figure 9, Figure 9 is an elevation, partly in section, showing the mould, positioned on the jointed ends of two lengths of extra high tension three core paper insulated and lead covered cable and filled with plastic insulating material, the filling aperture and gates being shown devoid of plastic material for the sake of clearness, Figure 10 is a cross-section taken on the line X—X in Figure 9, of the mould and cable shown therein, and Figure 11 is an elevation, on a reduced scale and partly in section, of a force pump employed to inject plastic insulating material.

The termination and its construction will be first described with reference to Figures 1 to 4 inclusive. The paper insulated conductor 1, shown in Figure 1, is fitted with a stress distributing cone 2 which is made from sheet copper. The lower end of the cone is cylindrical and is furnished with a number of slots 3 to enable it to be clamped firmly on the metallised outer surface 4 of the uncovered dielectric adjacent the end of the lead sheath 5, by means of a clamp 6 bonded to a clamp 7 embracing the lead sheath 5. The additional dielectric material applied to the cable dielectric 1 is a self-supporting moulded body 8 of homogeneous material and is of cylindrical form with an externally tapered lower end which fits into the lower part of the space between the cable dielectric and the stress cone.

The end part of the cable is housed within a cable gland 9 and a tubular insulator 10 on the top of which is mounted a terminal (not shown) to which the end of the conductor is coupled. The cable gland and insulator are of normal construction and consequently only sufficient of the complete termination is shown to illustrate the present invention. The space between the tubular insulator and the conductor with its normal and additional dielectric is filled in the usual way with suitable insulating oil or compound (not shown).

The mould by which the moulded body 8 is formed comprises the stress cone itself and the tubular body shown in Figures 2 and 3, which is formed in several parts to enable it to be removed from the cable after the moulding operation is completed. The detachable part of the mould is of metal, preferably brass, and is divided in radial planes into three superposed sections 11, 12 and 13, each of which is divided in an axial plane into two parts. The bottom section is formed with an internal cylindrical surface and an external conical surface tapered to enter the stress cone 2 and make a joint with the upper part of the internal surface thereof. The two parts of the section 11 are secured together by bolts through projecting ears 14 and the section is jointed to the middle section 12 by bolting together the flanges 15 and 16. The internal surface of the section 12 is cylindrical and forms a continuation of that of the section 11 except at its upper end which is of reduced diameter to fit the surface of the insulated conductor 1. The two parts of this section carry flanges 17 and 18 by which they are secured together. The top section is in the form of a cylindrical tube of which the internal diameter corresponds with the diameter of the insulated conductor 1 and is of the same diameter as and forms a continuation of the upper end of section 12. The parts of this section are jointed by bolting together the flanges 19 and 20 and the section is jointed to the middle section by bolting the flange 21 on its lower end to flange 22 on the upper end of the middle section. In an enlargement 23 on the upper face of the flange 21 is a screw threaded hole 24 for the attachment of a filling device. This hole communicates with a recess 25 cut in the under face of the flange and extending circumferentially in both directions to communicate with two holes 26 through the inwardly turned lip formed by the portion of the middle section of reduced diameter. These passages and holes form gates through which plastic material may be forced into the mould chamber from the top thereof.

Figure 4 shows the tubular body and stress cone assembled on the cable to form the complete mould ready for the filling operation. In assembling the mould, the stress cone 2 is first secured in position and the two halves (each consisting of one half of each of three sections) of the tubular body are placed round the cable and jointed by bolting together the longitudinal flanges of the halves. The tubular body is then moved endwise into engagement with the end of the cone 2. A clamping ring 27 is next placed round the cone and drawn towards the detachable part of the mould by bolts 28 located in slots 29 with their heads engaging the upper face of the flange 16. This holds the cone to the detachable part of the mould. The clamping ring 27 is preferably made of wood and is in two halves so that it can be readily placed in position, the two halves being secured together by bolts 30 before the endwise tightening takes place.

The plastic material is introduced into the mould with the aid of a force pump 31, shown in Figure 11, of which the nozzle 32 is screw-threaded to engage the screw-threaded recess 24 of the mould. Where the material is solid at normal temperatures and is softened by heat, it may be placed in the pump cylinder when cold and may be made plastic therein by heating the pump, for instance, by immersing it in a bath of hot oil after having closed the nozzle by screwing on a cap member 33. The force pump may be of known kind in which a piston 34 is moved forward by screwing down a threaded piston rod 35 which engages a screw-threaded hole in the cylinder cover 36.

Small apertures 37 may be provided at the upper end of the mould shell. These together with the uncovered portions of the slots 3 in the cone, act as vents and also serve to indicate when the mould has been completely filled with plastic material. They do not materially reduce the pressure to which the plastic material in the mould is subjected.

When the mould is full, the pump may be disconnected and the mould left until the material has set to a moulded body capable of supporting itself indefinitely without the aid of any supporting shell of any kind. When this has occured the parts of the removable portion of the mould shell may be separated and removed, leaving the moulded body 8 adhering to the cable dielectric. Separation is facilitated by the slots 38 in the flanges.

In Figure 5 there is shown a completed joint in an extra-high tension three core paper insulated and lead covered cable of the kind in which the insulated cores 40 are of oval section and wrapped with a metal or metallised tape 41 to give uniformity of stress in the dielectric. The core conductors 42 are jointed in the usual way by soldering them together with the aid of jointing ferrules 43. The cores are threaded through correspondingly shaped holes in metal discs 44 and are each fitted with a stress cone 45 formed by coiling round the core a tapered length of copper strip. The additional dielectric material surrounding the normal dielectric on each conductor is a self-supporting moulded body 46 of homogeneous material. It is of cylindrical form and completely encloses the length of the three cores between the inner faces of the discs 44. It will be observed that this body performs the dual function of replacing the normal core insulation removed to enable the conductors to be jointed and of reinforcing the normal core insulation in the neighbourhood of the joint. A lead sleeve 47 encloses the moulded body 46 and is jointed at its ends to the lead sheathings 48 of the cables by wiped metal joints 49. The space between the body 46 and the sleeve 47 is filled in the usual way with suitable insulating oil or compound 50.

The mould shell 51 employed in the construction of the joint is in the form of a cylindrical body having end portions 52 of reduced diameter to suit the external diameter of the lead sheath of the cable. The mould shell is divided in an axial plane into parts which may be secured together by bolts 53 through their flanges 54. The mould shell is also divided in a radial plane into parts which may be secured together by bolts 55 through their flanges 56 and 57. The two discs 44 which form the two ends of the mould are each positioned in the mould shell by a circumferential tongue 59 which fits in a circumferential groove at the end of the central part of the mould. A filling opening 60, screw threaded to receive the nozzle of a force pump, is provided in the top of the flange 56, which at this point is thickened up for the purpose. This opening communicates with a circumferential channel 61 formed by cutting a groove in the face of the flange 56. From this channel the plastic material is forced into the mould either through a number of passages entering the chamber at different points distributed uniformly round its circumference thereof as in the case of the termination described above or through a circumferential slot 62 which increases from a zero width at a point adjacent the filling opening 60 to a maximum at a point diametrically opposite. In the latter case the material passes into the mould in the form of an inwardly flowing annular stream of which the thickness is a minimum at or near the filling opening to which the forcing device is connected and increases with the distance from that point. This takes account of the drop in pressure which occurs along the length of the circumferential channel 61 and gives a uniform flow of material into the mould and avoids the possibility of the cores becoming laterally displaced under pressure of the inflowing material.

Figure 9 shows the mould assembled on the jointed cable and filled with plastic material. The latter has for the sake of clearness been omitted from the passages 61 and 62. In assembling the mould, the two lower parts will be bolted together and the two upper parts together. The upper and lower halves are then placed round the cable and bolted together. This clamps the end parts 52 on to the ends of the lead sheaths 48. Preferably the inner surfaces of the ends 52 are furnished with shallow screw threads 63 to provide a better grip. It will be seen from Figure 10 that the stress cones are held securely in position by engagement between the wall of the mould and central projections 64 on the discs 44. The discs 44 are furnished with vent holes 65. Vent holes 66 are also provided in the mould casing. These allow the escape of air and in addition serve to indicate when the mould has been completely filled with plastic material without, however, causing any material reduction in the pressure to which the plastic material in the mould is subjected.

The mould is filled in exactly the same way as described above in connection with the construction of cable termination. It will be understood of course that the metal discs 44 are not divided and remain in position when the mould shell is subsequently removed.

It has been found preferable in some cases to paint the surface of that part of each insulated conductor to which the moulded body is to be applied and also the interior of each stress cone with a solution of resin, or other solution of which the nature will be dependent on the class of moulding powder employed, before the mould is built up, in order to assist the adhesion of the moulded material. The internal parts of the mould shell may be chromium plated to prevent the moulded material from adhering to the surfaces of the mould. With some moulding materials no such precaution is necessary.

What we claim as our invention is:

1. An impregnated paper insulated electric cable including an insulated conductor and a conductive covering closely surrounding said insulated conductor and terminated at a distance from one end thereof, a stress-distributing cone fitted to the insulated conductor at the termination of the conductive covering, additional dielectric serving locally to reinforce the normal dielectric of the insulated conductor in the vicinity of the said cone, said additional dielectric comprising a self-supporting molded body of homogeneous, oil-insoluble, thermoplastic, insulating material molded in situ on the insulated conductor and in the said cone and extending between and adhering to the adjacent surface of the normal conductor dielectric and the internal surface of the said cone, an impervious enclosure for the projecting end of the insulated conductor, for the said cone and for the said additional dielectric, and a body of insulating fluid contained in said enclosure and surrounding the projecting end of the insulated conductor and said additional dielectric and in contact with said additional dielectric.

2. A method of applying additional insulation to an impregnated paper insulated cable including an insulated conductor and a conductive covering closely surrounding said insulated conductor and terminated at a distance from one end thereof, said method comprising applying to and securing in position on the cable a tubular mold which encloses a length of the projecting end of the insulated conductor and is formed in part by a conductive member that is located at the end of the said conductive covering and shaped to form a stress-distributing cone, introducing into the said mold a homogeneous, oil-insoluble, thermoplastic, insulating material in a plastic state, converting the said plastic insulating material into a self-supporting molded body, subsequently removing the said tubular mold other than the part constituting the stress-distributing cone, applying an impervious enclosure to said cable, and surrounding the exposed dielectric of said cable and said molded body by a body of insulating fluid contained in said enclosure.

3. A method of applying additional insulation to an impregnated paper insulated cable including an insulated conductor and a conductive covering closely surrounding the said insulated conductor and terminated at a distance from one end thereof, said method comprising applying to and securing in position on the cable a tubular mould which encloses a length of the projecting end of the insulated conductor and is formed in part by a conductive member that is located at the end of the said conductive covering and shaped to form a stress-distributing cone, painting the internal surface of the conductive member forming the stress-distributing cone with a substance for promoting adhesion between that surface and the additional insulation, introducing into the said mould a homogeneous, oil-insoluble, thermoplastic, insulating material in a plastic state, converting the said plastic insulating material into a self-supporting moulded body, subsequently removing the said tubular mould other than the part constituting the stress-distributing cone, applying an impervious enclosure to said cable, and surrounding the exposed dielectric of said cable and said moulded body by a body of insulating fluid contained in said enclosure.

4. A method of applying additional insulation to an impregnated paper insulated cable including an insulated conductor and a conductive covering closely surrounding said insulated conductor and terminated at a distance from one end thereof, said method comprising applying to and securing in position on the cable a tubular mould which encloses a length of the projecting end of the insulated conductor and is formed in part by a conductive member that is located at the end of the said conductive covering and shaped to form a stress-distributing cone, painting the internal surface of the conductive member forming the stress-distributing cone with a solution of a resin, introducing into the said mould a homogeneous, oil-insoluble, thermoplastic, insulating material in a plastic state, converting the said plastic insulating material into a self-supporting moulded body, subsequently removing the said tubular mould other than the part constituting the stress-distributing cone, applying an impervious enclosure to said cable, and surrounding the exposed dielectric of said cable and said moulded body by a body of insulating fluid contained in said enclosure.

ADA BOWDEN,
EDWARD BOWDEN,
*Executors of the Estate of Edward Bowden, deceased.*
STEPHEN CHAPLIN.